US008019890B2

(12) United States Patent
Abe

(10) Patent No.: US 8,019,890 B2
(45) Date of Patent: Sep. 13, 2011

(54) NETWORK SWITCH FOR LOGICAL ISOLATION BETWEEN USER NETWORK AND SERVER UNIT MANAGEMENT NETWORK AND ITS OPERATING METHOD

(75) Inventor: Shinji Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 1004 days.

(21) Appl. No.: 10/948,239

(22) Filed: Sep. 24, 2004

(65) Prior Publication Data

US 2005/0091387 A1 Apr. 28, 2005

(30) Foreign Application Priority Data

Sep. 26, 2003 (JP) ................................ 2003-336514

(51) Int. Cl.
*G06F 15/16* (2006.01)
(52) U.S. Cl. ....................................... 709/245; 709/228
(58) Field of Classification Search .................. 709/245, 709/228
See application file for complete search history.

(56) References Cited

U.S. PATENT DOCUMENTS

| 6,871,210 | B1 * | 3/2005 | Subramanian ................ 709/203 |
| 6,968,394 | B1 * | 11/2005 | El-Rafie ........................ 709/245 |
| 7,363,374 | B2 * | 4/2008 | Paul et al. ..................... 709/226 |
| 2002/0112076 | A1 * | 8/2002 | Rueda et al. .................. 709/245 |

FOREIGN PATENT DOCUMENTS

JP 2000-134207 A 5/2000

OTHER PUBLICATIONS

Jaffe, Dave, "Examining Web Serving on the PowerEdge 1655MC", Feb. 2003, Dell Power Solutions.*

* cited by examiner

*Primary Examiner* — Phuoc Nguyen
*Assistant Examiner* — Mark Fearer
(74) *Attorney, Agent, or Firm* — Foley & Lardner LLP

(57) ABSTRACT

In a network switch including a user network port connectable to a user network, a plurality of down link ports each connectable to one server unit, a server unit management network port connectable to a server unit management network for managing the server unit, a store-and-forward switching unit connected to the user network port, the down link ports and the server unit management network port, and a control unit connected to the store-and-forward switching unit, when a packet that has arrived at one of the down link ports is a dynamic host configuration protocol (DHCP) packet including a network boot option, the control unit operates the store-and-forward switching unit to transmit the packet to the server unit management network port.

36 Claims, 12 Drawing Sheets

Fig. 4A

| PORT | USER NETWORK GROUP BIT |
|---|---|
| 41-1 | "1" |
| 41-2 | "0" |
| 41-3 | "1" |
| 41-4 | "1" |
| 41-5 | "1" |
| 41-6 | "1" |
| 41-7 | "1" |
| 41-8 | "1" |

| PORT | MANAGEMENT NETWORK GROUP BIT |
|---|---|
| 41-1 | "0" |
| 41-2 | "1" |
| 41-3 | "1" |
| 41-4 | "1" |
| 41-5 | "1" |
| 41-6 | "1" |
| 41-7 | "1" |
| 41-8 | "1" |

| PORT | DOWN LINK GROUP BIT |
|---|---|
| 41-1 | "0" |
| 41-2 | "0" |
| 41-3 | "1" |
| 41-4 | "1" |
| 41-5 | "1" |
| 41-6 | "1" |
| 41-7 | "1" |
| 41-8 | "1" |

| PORT | MAC |
|---|---|
| 41-1 | MAC(11), MAC(12-1), MAC(12-2), MAC(13) |
| 41-2 | MAC(31) |
| 41-3 | MAC(2-1) |
| 41-4 | MAC(2-2) |
| 41-5 | MAC(2-3) |
| 41-6 | MAC(2-4) |
| 41-7 | MAC(2-5) |
| 41-8 | MAC(2-6) |

48

NETWORK SWITCH FOR LOGICAL ISOLATION BETWEEN USER NETWORK AND SERVER UNIT MANAGEMENT NETWORK AND ITS OPERATING METHOD

BACKGROUND OF THE INVENTION

1. Field of the Invention

The present invention relates to a computer network system including a user network, server units and a server unit management network, and more particularly, to a network switch for logically isolating the user network and the server unit management network from each other and its operating method.

2. Description of the Related Art

Generally, a computer network system is constructed by user computers and a plurality of server units having different functions such as a Web server unit, a mail server unit, an application server unit and the like.

The loads of the server units fluctuate on a time basis. For example, the load of the Web server unit is remarkably increased for one time period, and the load of the application server unit is remarkably increased for another time period.

One approach to overcome the fluctuation of the loads of the server units is to provide a plurality of server units for each of the different functions, which is, however, not economical.

Another approach is a providing or deployment system where one pool server unit including no operating system (OS) and no application software and a server unit management computer are provided. When the load of one of the server units is remarkably increased, the server unit management computer automatically installs the OS of the overloaded server unit and its application software in the pool server unit, thus reducing the load of the overloaded server unit, which is economical.

An automatic installing operation of the OS and application software performed upon the pool server unit is carried out by a network boot function called a pre-boot execution environment (PXE) boot function which is an extended function of a dynamic host configuration protocol (DHCP). Note that DHCP is a protocol for assigning an Internet protocol (IP) address to nodes within a network.

A PXE boot function is included in a PXE agent in a basic input output system (BIOS) of the pool server unit. Briefly, the PXE requests an assignment of an IP address from a DHCP server unit. Then, the PXE agent requests necessary parameters such as the name of a boot file and the name of an accessed server unit. Then, after the PXE agent has obtained the necessary parameters, the PXE agent accesses a suitable PXE server unit to download the boot file. Finally, the PXE agent executes the boot file to initiate the operation of the pool server unit.

The above-mentioned server unit management computer and the PXE server are provided in a server unit management network which is isolated from a user network in view of security. That is, if the server unit management network is accessible from the user network, the server unit management network could be easily attacked.

Generally, isolation technology for networks is divided into physical isolation technology using a plurality of network controllers and logical isolation using virtual local area networks (VLANs). Note that automatic participation and secession of a virtual group for VLANs is disclosed in JP-A-2000-134207.

The physical isolation technology is disadvantageous in terms of manufacturing cost. That is, one network controller for the user network and one network controller for the server unit management network have to be mounted in each of the server units. Also, in order to realize a duplex system for preparing for a failure, two more redundancy network controllers have to be mounted in each of the server units. This is further disadvantageous in terms of manufacturing cost. Particularly, in a blade server apparatus where a plurality of server blades are mounted in one chassis, the increased number of network controllers would decrease the mounting density.

On the other hand, the logical isolation technology cannot realize the PXE boot function. That is, the PXE boot function does not have a definition for VLANs, and a DCHP packet generated by the PXE agent does not include VLAN tags. Therefore, the PXE boot function is incompatible with the logical isolation using VLANs.

SUMMARY OF THE INVENTION

It is an object of the present invention to provide a network switch for logical isolation between a user network and a server unit management network without VLANs.

Another object is to provide a method for operating the above-mentioned network switch.

According to the present invention, in a network switch including a user network port connectable to a user network, a plurality of down link ports each connectable to one server unit, a server unit management network port connectable to a server unit management network for managing said server unit, a store-and-forward switching unit connected to the user network port, the down link ports and the server unit management network port, and a control unit connected to the store-and-forward switching unit, when a packet that has arrived at one of the down link ports is a dynamic host configuration protocol (DHCP) packet including a network boot the control unit operates the store-and-forward switching unit to transmit the packet to the server unit management network port.

Also, a media access control (MAC) address storing unit is connected to the control unit and constructed to store a correspondence between the user network port, the down link ports and the server unit management network port, and MAC addresses of nodes connected thereto, and a user network group register is connected to the control unit and constructed to store data defining a user network group formed by the user network port and the down links. When a packet arrives at the user network port and a destination MAC address stored in the MAC address storing unit corresponds to a port of the user network group defined by the user network group register, the control unit operates the store-and-forward switching unit to transmit the packet to the port of the user network group.

Further, a server unit management network group register is connected to the control unit and constructed to store data defining a server unit management network group formed by the server unit management network port and the down links. When a packet arrives at the server unit management network port and a destination MAC address stored in the MAC address storing unit corresponds to a port of the server unit management network group defined by the server unit management network group register, the control unit operates the store-and-forward switching unit to transmit the packet to the port of the server unit management network group.

BRIEF DESCRIPTION OF THE DRAWINGS

The present invention will be more clearly understood from the description set forth below, with reference to the accompanying drawings, wherein:

FIG. 4A is a diagram showing an example of the content of the user network group register of FIG. 3;

FIG. 4B is a diagram showing an example of the content of the server unit management network group register of FIG. 3;

FIG. 4C is a diagram showing an example of the content of the down link group register of FIG. 3;

FIG. 4D is a diagram showing an example of the content of the server unit management network IP subnet register of FIG. 3;

FIG. 4E is a diagram showing an example of the content of the media access control (MAC) address register of FIG. 3;

DETAILED DESCRIPTION OF THE PREFERRED EMBODIMENT

Figure 1:
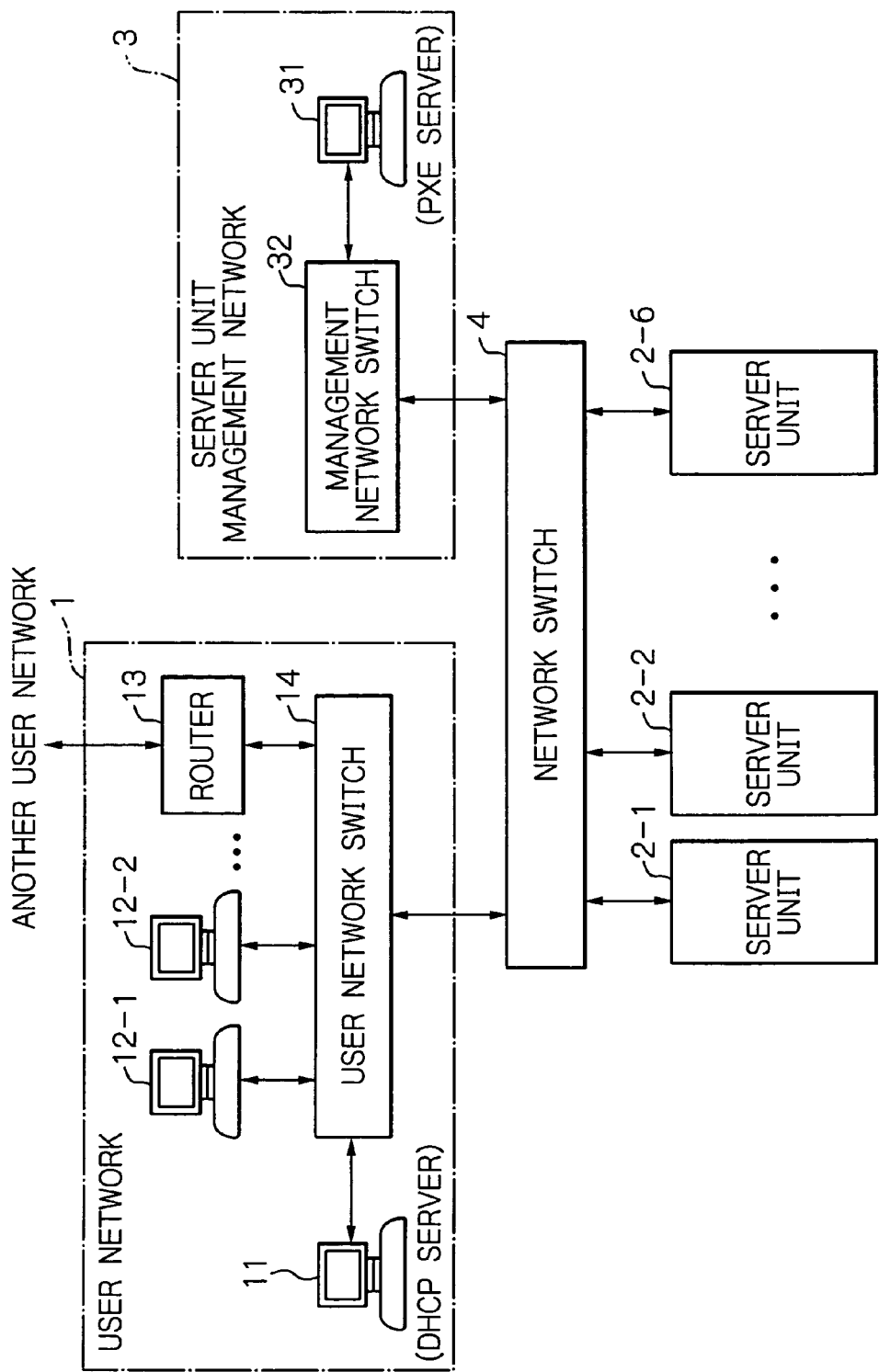
FIG. 1 is a block circuit diagram illustrating an embodiment of the network system according to the present invention.

In FIG. 1, which illustrates an embodiment of the network system according to the present invention, a user network 1, server units 2-1, 2-2, . . . , 2-6 for storing operating systems ($OS_S$) and their application software for the user network 1, and a server unit management network 3 for managing the server units 2-1, 2-2, . . . , 2-6 are provided. The user network 1 and the server unit management network 3 are physically isolated by a network switch 4 which is connected to the server units 2-1, 2-2, . . . , 2-6.

Different IP subnets, i.e., different IP sub network address are allocated to the user network 1 and the server unit management network 3. For example, an IP subnet "192.168.0.0/24" is assigned to the user network 1, and an IP subnet "192.168.1.0/24" is assigned to the server unit management network 3. Note that "/24" means that the number of bits of a subnet is 24 bits.

Some of the server units 2-1, 2-2, 2-6 are always operated, while the other server units called pool server units are not operated. When one of the operated server units is overloaded, one of the pool server units is newly operated as a server unit, so that the load of the overloaded server unit is dispersed to the newly operated server unit.

The user network 1 is constructed by a DHCP server 11, user computers 12-1, 12-2, a router 13 connectable to another user network (not shown), and a user network switch 14. The DHCP server 11 dynamically assigns IP addresses whose subnet is "192.168.0.0" to the user computers 12-1, 12-2, . . . , the router 13 and the servers 2-1, 2-2, 2-6. The user network switch 14 carries out a communication among the DHCP server 11, the user server 13 and the servers 2-1, 2-2, . . . , 2-6.

The server unit management network 3 is constructed by a server unit management computer or a PXE server 31 and a management network switch 32. The PXE server 31 manages the server units 2-1, 2-2, . . . , 2-6 and the network switch 4 through the server unit management network switch 32. The PXE server 31 boots one of the pool servers to install a required operating system (OS) and its application software therein.

The network switch 4 carries out a communication among the user network 1, the server units 2-1, 2-2, . . . , 2-6 and the server unit management network 3.

In FIG. 1, an unauthorized access may be performed upon the user network 1 and the server units 2-1, 2-2, . . . , 2-6 via the router 13; however, such an unauthorized access is never performed upon the server unit management network 3.

Figure 2:
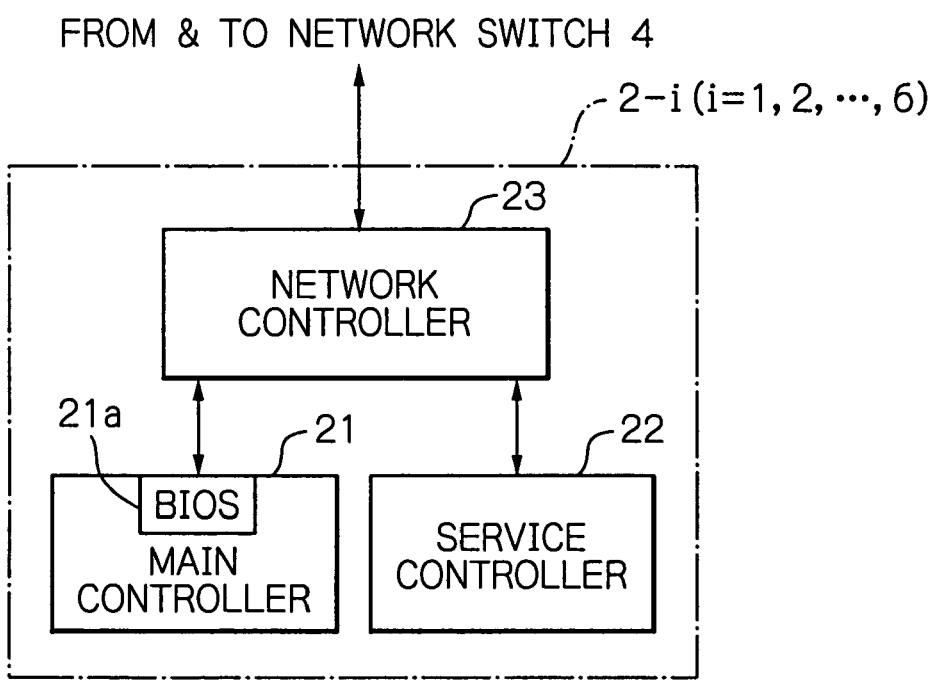
FIG. 2 is a detailed block circuit diagram of the server unit of FIG. 1.

In FIG. 2, which is a detailed block circuit diagram of the server unit 2-$i$ (i=1, 2, . . . , 6) of FIG. 1, the server unit 2-$i$ is constructed by a main controller 21, a service controller 22 and a network controller 23.

The main controller 21 and the service controller 22 are powered by different power sources, i.e., a main power source and a service power source (not shown), respectively. As a result, the service controller 22 can be operated independently of the main controller 21. For example, the service controller 22 can be operated regardless of whether or not an operating system (OS) is not installed in the main controller 21 and regardless of whether or not the main controller 21 is powered ON.

The main controller 21 includes a central processing unit (CPU) to carry out data processing required by the user computers 12-1, 12-2, . . . of the user network 1. Also, the main controller 21 includes a basic input/output system (BIOS) 21$a$ on which a PXE agent is mounted. In this case, a PXE boot operation can be carried out between the main controller 21 and the PXE server 31 of the server unit management network 3.

The service processor 22 manages the hardware of the server unit 2-$i$. For example, the service processor 22 initiates and terminates the operation of the main processor 21.

The network controller 23 is an interface between the main controller 21, the service controller 22, and the network switch 4. In this case, the network controller 23 carries out communication with the server unit management network 3 as well as communication with the user network 1.

Either an IP address for the user network 1 or an IP address for the server unit management network 3 is assigned to the network controller 23.

For example, when an IP address for the user network 1 is assigned to the network controller 23 of the server unit 2-$i$, this IP address would be "192.168.0.i" where the subnet mask is "255.255.255.0". The assignment of this IP address is carried out by the DHCP server 11. On the other hand, when an IP address for the server unit management network 3 is assigned to the network controller 23 of the server unit 2-$i$, this IP address would be "192.168.1.i" where the subnet mask is "255.255.255.0". The assignment of this IP address is carried out by the PXE server 31.

Figure 3:
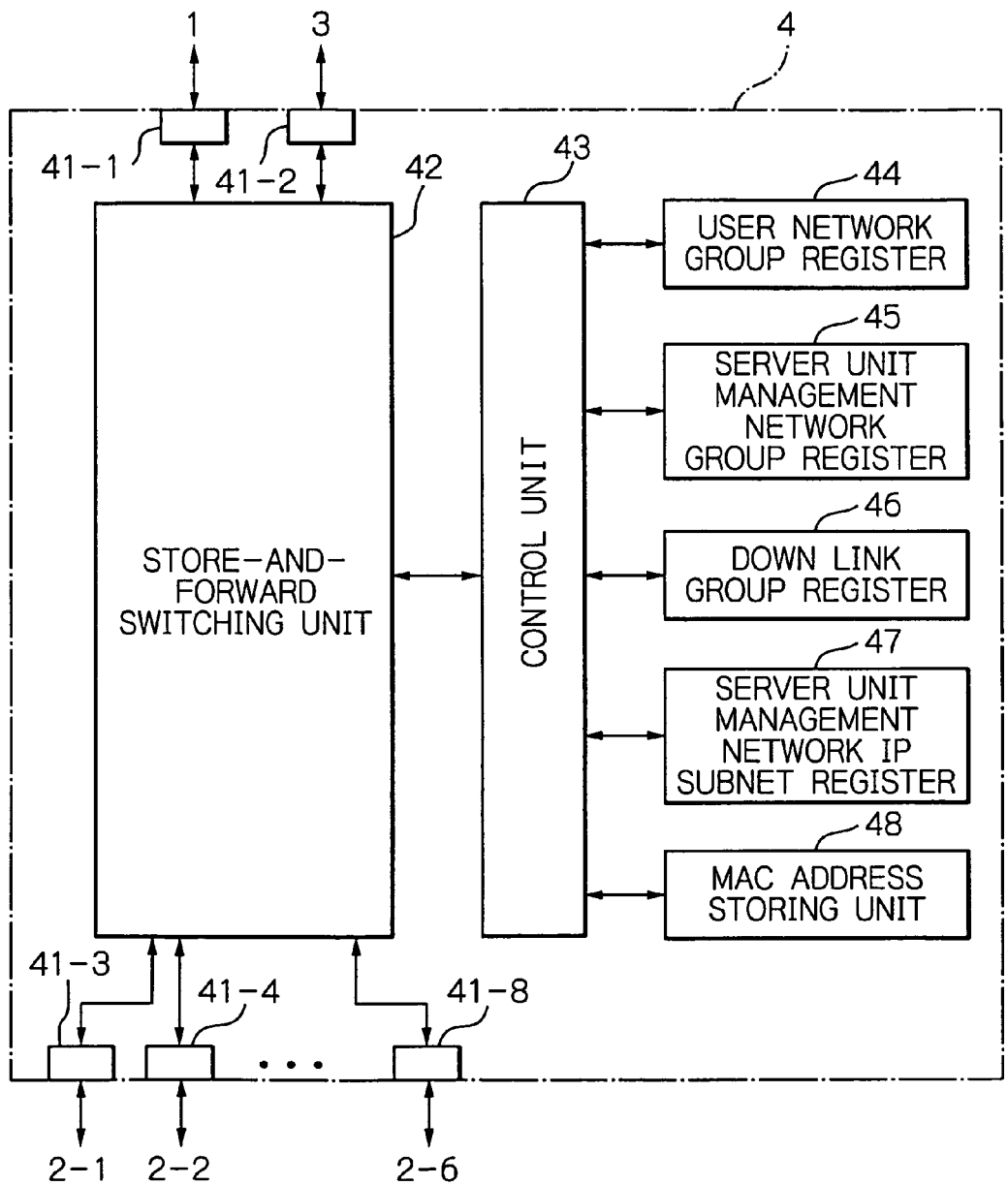
FIG. 3 is a detailed circuit diagram of the network switch of FIG. 1.

In FIG. 3, which is a detailed circuit diagram of the network switch 4 of FIG. 1, ports 41-1, 41-2, 41-3, 41-4, . . . , 41-6 are provided and connected to the user network 1, the server unit management network 3, the server units 2-1, 2-2, . . . , 2-6, respectively. In this case, the port 41-1 is called a user network port, and the port 41-2 is called a server unit management network port. Also, the ports 41-3 to 41-8 are called down link ports.

When a packet arrives at one of the ports 41-1 to 41-8, a destination port is selected from the other ports by a store-and-forward switching unit 42 in accordance with destination port information included in the packet, so that the packet is transmitted to the destination port.

The store-and-forward switching unit 42 is controlled by a control unit 43 which is connected to a user network group register 44, a server unit management network group register 45, a down link group register 46, a server unit management network IP subnet register 47 and a media access control (MAC) address storing unit 48. The control unit 43 may be constructed by a central processing unit (CPU), a read-only memory (ROM) for storing programs, a random-access memory (RAM) for storing data, and the like.

The user network group register 44 is formed by eight user network group bits for showing whether or not the ports 41-1 to 41-8 belong to a user network group relating to a communication with the user network 1. As shown in FIG. 4A, the ports 41-1 and 4-3 to 4-8 belong to the user network group, and therefore, the user network group bits for the ports 41-1 and 41-3 to 41-8 are set to be "1". On the other hand, the user network group bit for the port 41-2 (the server unit management network port 41-2) is reset (="0"). As a result, the server unit management network port 41-2 is never related to a communication with the user network 1. Therefore, even when a packet arrives at the user network port 41-1, it is impossible to transmit this packet to the server unit management network 3 by the user network group register 44. Note that the user network group bits are set by the operator using the control unit 43 in advance.

The server unit management network group register 45 is formed by eight management network group bits for showing whether or not the ports 41-1 to 41-8 belong to a server unit management network group relating to a communication with the server unit management network 3. As shown in FIG. 4B, the ports 41-2 to 4-8 belong to the server unit management network group, and therefore, the management network group bits for the ports 41-2 to 41-8 are set to be "1". On the other hand, the management network group bit for the port 41-1 (the user network port 41-1) is reset (="0"). As a result, the user network port 41-1 is never related to a communication with the server unit management network 3. Therefore, even when a packet arrives at the server unit management network port 41-2, it is impossible to transmit this packet to the user network 1 by the server unit management network group register 45. Note that the management network group bits are set by the operator using the control unit 43 in advance.

The down link group register 46 is formed by eight down link group bits for showing whether or not the ports 41-1 to 41-8 are connected to the server units 2-1 to 2-6. As shown in FIG. 4C, since the ports 41-3 to 41-8 are connected to the server units 2-1 to 2-6, respectively, the down link group bits for the ports 41-3 to 41-8 are set to be "1". On the other hand, since no server unit is connected to the ports 41-1 and 41-2, the down link group bits for the ports 41-1 and 41-2 are reset (="0"). Note that the down link group bits are set by the operator using the control unit 43 in advance.

The server unit management network IP subnet register 47 stores the IP subnet of the server unit management network 3 which is in this case "192.168.1.0/24", as shown in FIG. 4D. When a packet arrives at one of the ports 41-3 to 41-8, it is possible to transmit this packet to the user network port 41-1 or the server unit management network port 41-2 by the server unit management network IP subnet register 47. Note that an IP subnet is set in the server unit management network IP subnet register 47 by the operator using the control unit 43 in advance.

The MAC address storing unit 48 stores a correspondence between the ports 41-1 to 41-8 and MAC addresses of nodes connected thereto, as shown in FIG. 4E. In this case, the nodes means the DHCP server 11, the user computer 12-1, 12-2, ..., the router 13, the server units 2-1, 2-2, ..., 2-6 and the PXE server 31. The MAC address storing unit 48 is initially cleared. Therefore, every time a packet arrives at one of the ports 41-1 to 41-8, the control unit 43 searches the MAC address of a source of this packet. As a result, if this MAC address is not stored in the MAC address storing unit 48 yet, the control unit 48 stores this MAC address in relation to the above-port in the MAC address storing unit 48. This is called a learning function included in the control unit 43. The MAC address storing unit 48 is used for determining the destination of a packet received by the network switch 4 in the same way as in the conventional layer 2 switch.

The operation of the control unit 43 of FIG. 3 is explained next with reference to FIGS. 5, 6 and 7.

Figure 5:
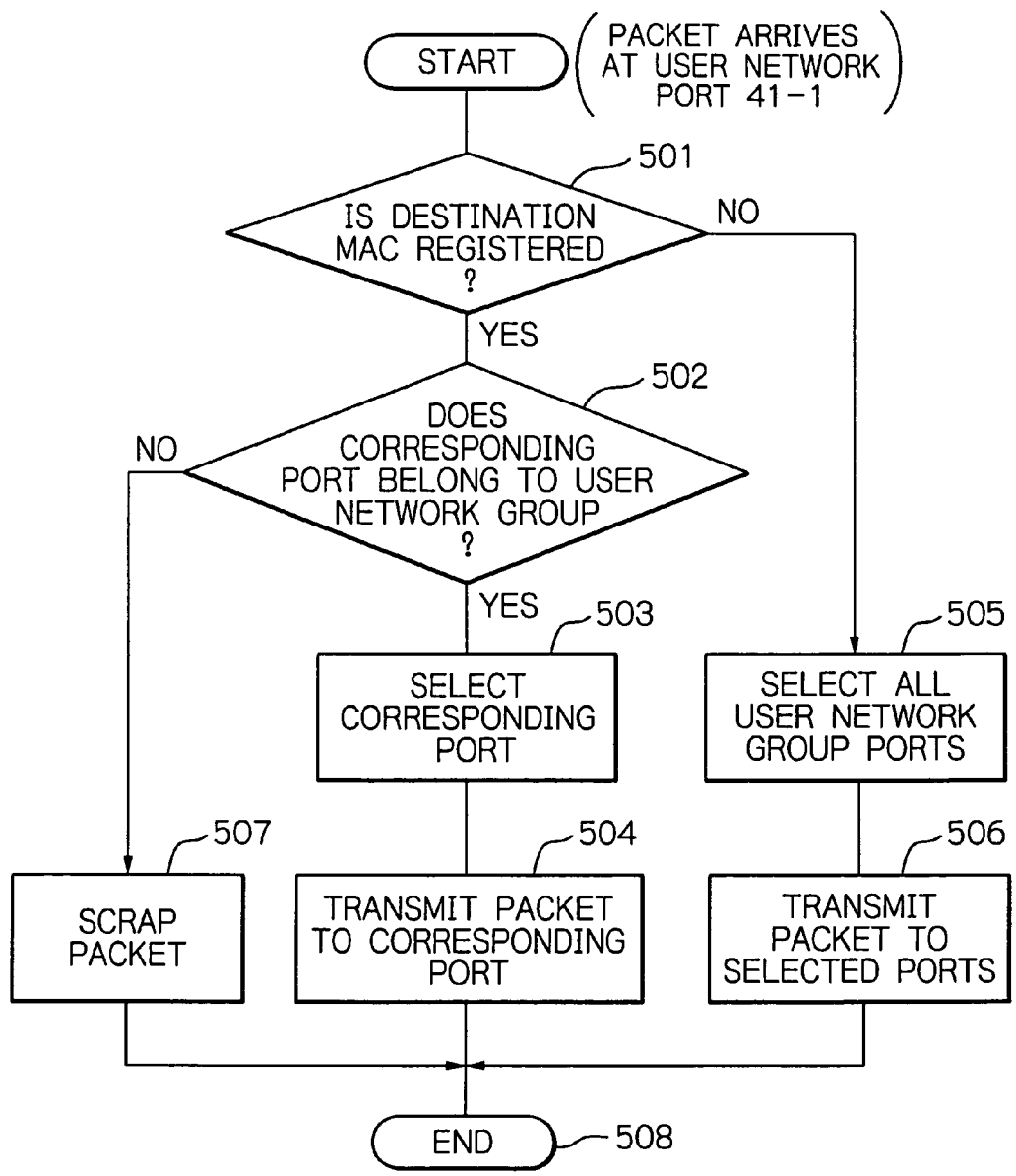
FIGS. 5, 6 and 7 are flowcharts for explaining the operation of the control unit of FIG. 3.

An interrupt routine as illustrated in FIG. 5 is started when a packet arrives at the user network port 41-1 to generate an interrupt signal. Note that this routine can be a subroutine of a main routine executed when a packet arrives at the user network 41-1.

First, at step 501, the control unit 43 reads a destination MAC address of a destination of the packet from the packet received by the store-and-forward switching unit 42 to determine whether or not this destination MAC address is registered in the MAC address storing unit 48. As a result, only when the destination MAC address is registered, does the control proceed to step 502. Otherwise, the control proceeds to steps 505 and 506.

At step 502, the control unit 43 determines whether or not a port corresponding to the registered destination MAC address belongs to the user network group by the user network group register 44. As a result, only when the corresponding port belongs to the user network group, does the control proceed to steps 503 and 504. Otherwise, the control proceeds to step 507.

At step 503, the control unit 43 operates the store-and-forward switching unit 42 to select the corresponding port. Then, at step 504, the control unit 42 operates the store-and-forward switching unit 42 to transmit the packet that has arrived at the port 41-1 to the corresponding port.

On the other hand, at step 505, the control unit 42 operates the store-and-forward switching unit 41 to select all the ports belonging to the user network group except for the port 41-1 by the user network group register 44. Then, at step 506, the control unit 42 operates the store-and-forward switching unit 41 to transmit the packet that has arrived at the port 41-1 to all the user network group ports except for the user network port 41-1, which are in this case the ports 41-3 to 41-6. That is, a similar operation to that of the conventional layer 2 switch is carried out by using the destination MAC address.

Also, at step 507, the packet is scrapped.

Then, the routine of FIG. 5 is completed by step 508.

Thus, in FIG. 5, a packet that has arrived at the user network port 41-1 is prevented from being transmitted to the server unit management network port 41-2, realizing logical isolation of the user network 1 and the server unit management network 3.

Figure 6:
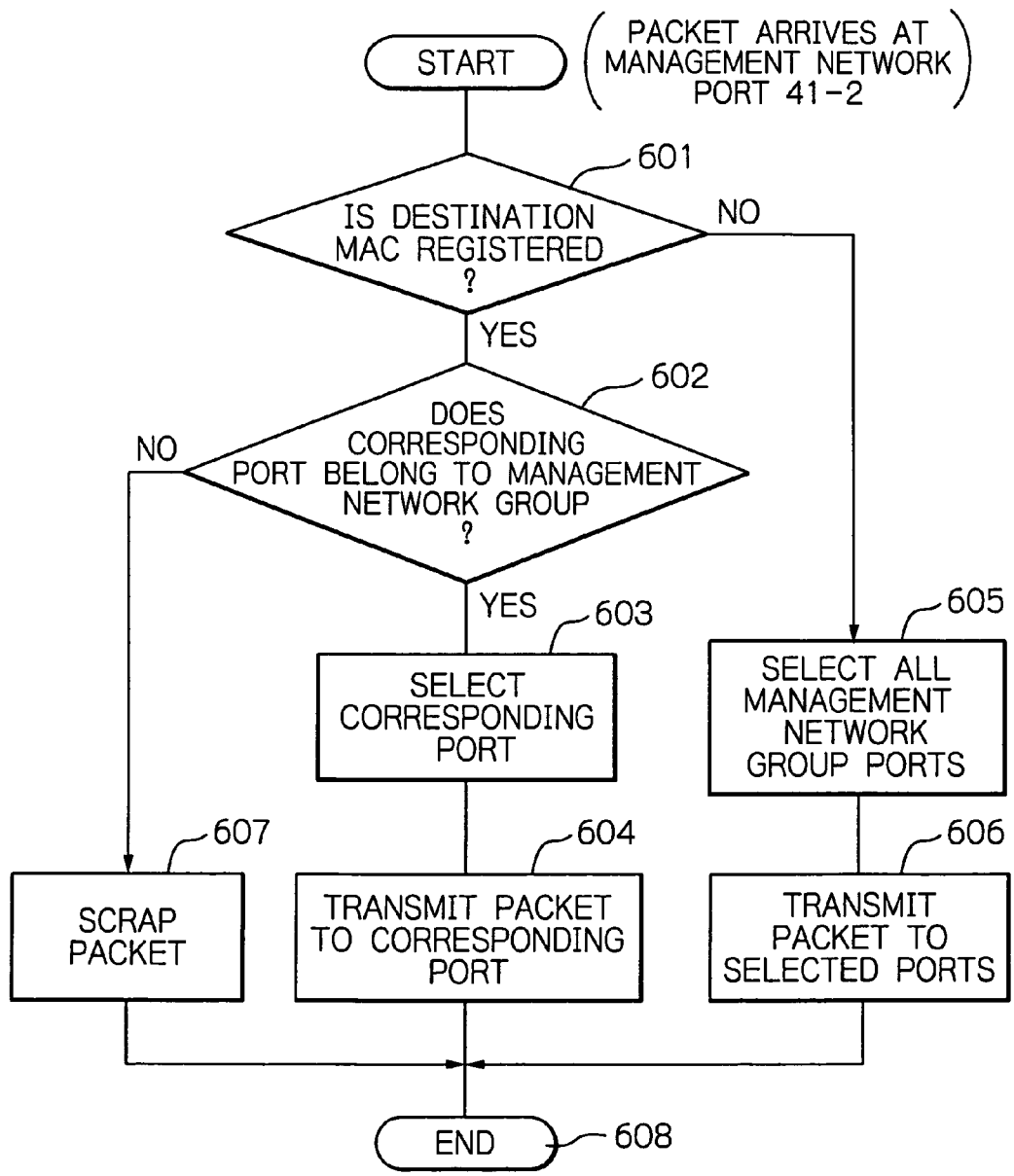

An interrupt routine as illustrated in FIG. 6 is started when a packet arrives at the server unit management network port 41-2 to generate an interrupt signal. Note that this routine can be a subroutine of a main routine executed when a packet arrives at the server unit management network port 41-2.

First, at step 601, the control unit 43 reads a destination MAC address of a destination of the packet from the packet received by the store-and-forward switching unit 42 to determine whether or not this destination MAC address is registered in the MAC address storing unit 48. As a result, only when the destination MAC address is registered, does the control proceed to step 602. Otherwise, the control proceeds to steps 605 and 606.

At step 602, the control unit 43 determines whether or not a port corresponding to the registered destination MAC address belongs to the server unit management network group by the server unit management network group register 45. As a result, only when the corresponding port belongs to the server unit management network group, does the control proceed to steps 603 and 604. Otherwise, the control proceeds to step 607.

At step 603, the control unit 43 operates the store-and-forward switching unit 42 to select the corresponding port. Then, at step 604, the control unit 42 operates the store-and-forward switching unit 42 to transmit the packet that has arrived at the port 41-2 to the corresponding port.

On the other hand, at step 605, the control unit 42 operates the store-and-forward switching unit 41 to select all the ports belonging to the server unit management network group except for the port 41-2 by the server unit management network group register 45. Then, at step 606, the control unit 42 operates the store-and-forward switching unit 41 to transmit the packet that has arrived at the port 41-2 to all the server unit management network group ports except for server unit management network port 41-2, which are in this case the ports 41-3 to 41-6. That is, a similar operation to that of the conventional layer 2 switch is carried out by using the destination MAC address.

Also, at step 607, the packet is scrapped.

Then, the routine of FIG. 6 is completed by step 608.

Thus, in FIG. 6, a packet that has arrived at the user network port 41-2 is prevented from being transmitted to the user network port 41-1, realizing logical isolation of the user network 1 and the server unit management network 3.

Figure 7:
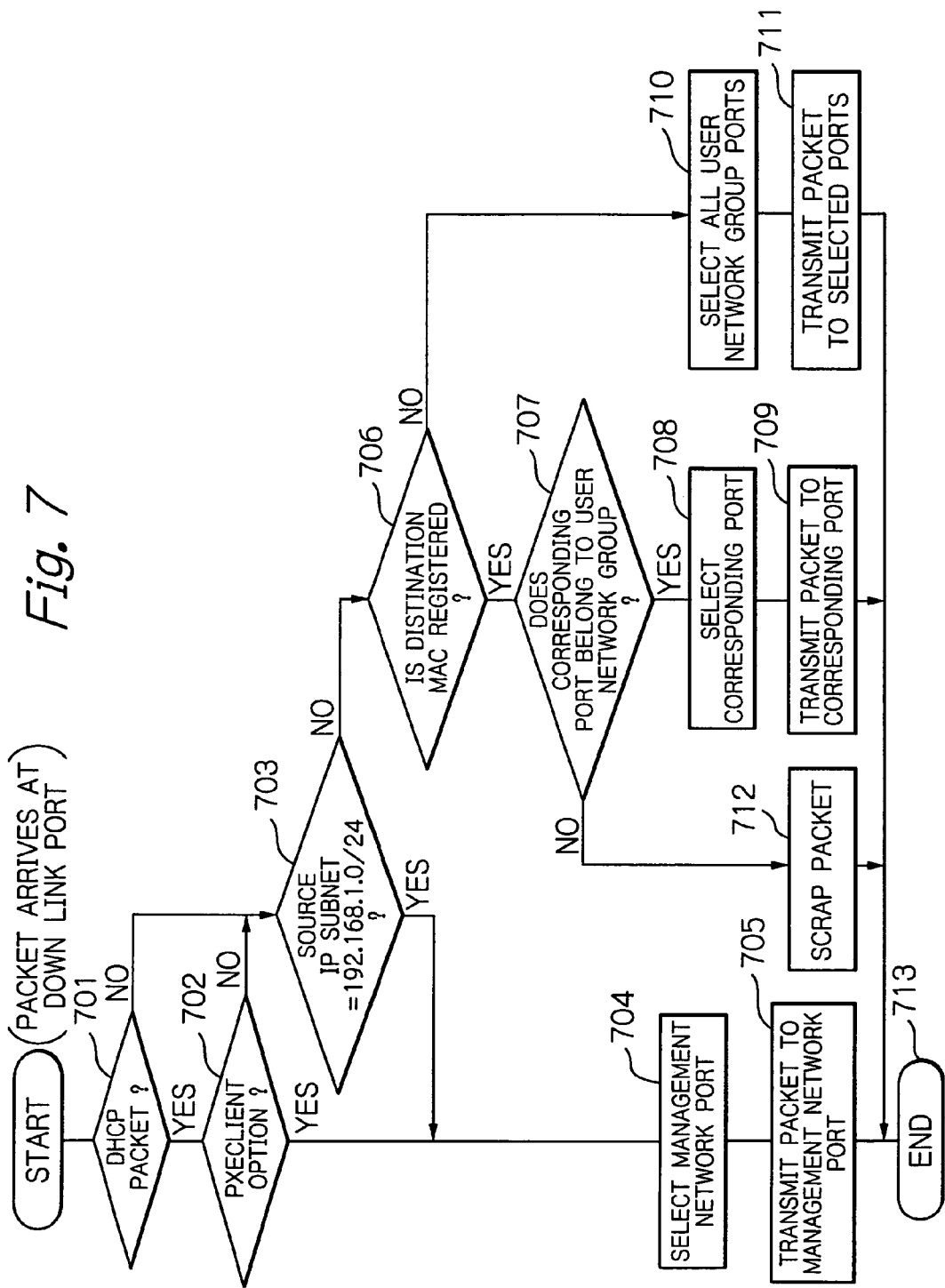

An interrupt routine as illustrated in FIG. 7 is started when a packet arrives at one of the down link ports 41-3 to 41-8 to generate an interrupt signal. Note that this routine can be a subroutine of a main routine executed when a packet arrives at one of the down link ports 41-3 to 41-8.

First, at step 701, the control unit 43 determines whether or not the packet received by the store-and-forward switching unit 42 is a DHCP packet for requesting an assignment of an IP address for the DHCP server 11 of the user network 1 or the PXE server 31 of the server unit management network 3. Also, at step 702, the control unit 43 determines whether or not a vender portion of the DHCP packet determined at step 701 includes a text "PXE Client" indicating that this DHCP packet is for the PXE server 31 of the server unit management network 3. As a result, only when the packet received by the store-and-forward switching unit 42 is a DHCP packet for the PXE server 31 of the server unit management network 3, does the control proceed to steps 704 and 705. Otherwise, i.e., when the packet received by the store-and-forward switching unit 42 is a DHCP packet for the DHCP server 11 of the user network 1 or a non-DHCP packet, the control proceeds to step 703.

At step 703, the control unit 43 reads a source IP subnet of the packet received by the store-and-forward switching unit 42 to determine whether or not this source IP subnet is the IP subnet (=192.168.1.0/24) of the server unit management network 3 by the server unit management network IP subnet register 47. Only when this source IP subnet is 192.168.1.0/24, does the control proceed to step 704, since the packet received by the store-and-forward switching unit 42 is used under the server unit management network 3. Otherwise, the control proceeds to steps 706 to 712.

At step 704, the control unit 43 operates the store-and-forward switching unit 42 to select the server unit management network port 41-2. Then, at step 705, the control unit 42 operates the store-and-forward switching unit 42 to transmit the packet that has arrived at the down link port to the server unit management network port 41-2.

On the other hand, at step 706, the control unit 43 reads a destination MAC address of a destination of the packet from the packet received by the store-and-forward switching unit 42 to determine whether or not this destination MAC address is registered in the MAC address storing unit 48. As a result, only when the destination MAC address is registered, does the control proceed to step 707. Otherwise, the control proceeds to steps 710 and 711.

At step 707, the control unit 43 determines whether or not a port corresponding to the registered destination MAC address belongs to the user network group by the user network group register 44. As a result, only when the corresponding port belongs to the user network group, does the control proceed to steps 708 and 709. Otherwise, the control proceeds to step 712.

At step 708, the control unit 43 operates the store-and-forward switching unit 42 to select the corresponding port. Then, at step 709, the control unit 42 operates the store-and-forward switching unit 42 to transmit the packet that has arrived at the down link port to the corresponding port.

On the other hand, at step 710, the control unit 42 operates the store-and-forward switching unit 41 to select all the ports belonging to the user network group except for the down link port at which the packet arrives by the user network group register 44. Then, at step 711, the control unit 42 operates the store-and-forward switching unit 41 to transmit the packet that has arrived at the down link port to all the user network group ports except for the down link port. That is, a similar operation to that of the conventional layer 2 switch is carried out by using the destination MAC address.

Also, at step 712, the packet is scrapped.

Then, the routine of FIG. 7 is completed by step 713.

In FIG. 7, a packet that has arrived at one of the down link ports 41-3 to 41-8 can be suitably transmitted to the user network port 41-1 or the server unit management network 41-2. Thus, the user network 1 is logically isolated from the server unit management network 3.

An operation of assignment of an IP address for the user network 1 to one of the server units 2-1 to 2-6 will be explained next with reference to FIG. 8 where the routines of FIGS. 5 and 7 are used.

First, at step 801, one server unit broadcasts a DHCP packet without a PXE Client option. In this case, a destination IP address is the broadcast address, i.e., 255.255.255.255. Also, this DHCP packet includes the source IP subnet "192.168.0.0/24".

Next, at step 802, the DHCP packet is received by the network switch 4, so that the control unit 43 carries out the operation of the routine of FIG. 7. That is, since the DHCP packet includes no PXE Client option, the control proceeds from step 701 via step 702 to step 703. In this case, since the source IP subnet is not "192.168.1.0/24", the control proceeds from step 703 to step 706. Also, since no destination MAC address is present, the control proceeds from step 706 to steps 710 and 711. In this case, it is assumed that the MAC address of the DHCP server 11 is registered in the MAC address storing unit 48 and correspond to the user network port 41-1 (see: FIG. 4E) which belongs to the user network group (see FIG. 4A). Therefore, the DHCP packet is transmitted to the DHCP server 11 as indicated by step 803. Note that the broadcast packet is never transmitted to the server unit management network 3 by steps 710 and 711.

Next, at step 804, the DHCP server 11 broadcasts an IP address packet. In this case, a destination IP address is the broadcast address, i.e., 255.255.255.255.

Next, at step 805, the IP address packet is received by the network switch 4, so that the control unit 43 carries out the operation of the routine of FIG. 5. That is, since no destination MAC address is present, the control proceeds from step 501 to steps 505 and 506. In this case, it is assumed that the MAC address of the server unit is registered in the MAC address storing unit 48 and correspond to one of the ports 41-3 to 41-8 (see: FIG. 4E) which belongs to the user network group (see FIG. 4A). Therefore, the IP address packet is transmitted to the server unit as indicated by step 806. Note that the broadcast IP address packet is never transmitted to the server unit management network by steps 505 and 506.

Thus, an IP address for the user network 1 is assigned to the server unit.

An operation of assignment of an IP address for the server unit management network 3 to one of the server units 2-1 to 2-6 will be explained next with reference to FIG. 9 where the routines of FIGS. 6 and 7 are used.

First, at step 901, one server unit broadcasts a DHCP packet with a PXE Client option. In this case, a destination IP address is the broadcast address, i.e., 255.255.255.255. Also, this DHCP packet includes the source IP subnet "192.168.1.0/24".

Next, at step 902, the DHCP packet is received by the network switch 4, so that the control unit 43 carries out the operation of the routine of FIG. 7. That is, since the DHCP packet includes the PXE Client option, the control proceeds from step 701 via step 702 to steps 704 and 705. As a result, the server unit management port 41-2 is selected, the DHCP packet is transmitted to the PXE server 31 as indicated by step 903. Note that the broadcast PHCP packet is never transmitted to the user network 1 by steps 710 and 711.

Next, at step 904, the PXE server 31 broadcasts an IP address packet. In this case, a destination IP address is the broadcast address, i.e., 255.255.255.255.

Next, at step 905, the IP address packet is received by the network switch 4, so that the control unit 43 carries out the operation of the routine of FIG. 6. That is, since no destination MAC address is present, the control proceeds from step 601 to steps 605 and 606. In this case, it is assumed that the MAC address of said server unit is registered in the MAC address storing unit 48 and corresponds to one of the ports 41-3 to 41-8 (see: FIG. 4E) which belongs to the user network group (see FIG. 4A). Therefore, the IP address packet is transmitted to the server unit as indicated by step 906. Note that the broadcast IP address packet is never transmitted to the server unit management network 3 by steps 605 and 606.

Thus, an IP address for the server unit management network 3 is assigned to the server unit.

A PXE boot operation will be explained next with reference to FIG. 10 where the routines of FIGS. 6 and 7 and the sequences of 8 and 9 are used. Here, it is assumed that the server units 2-1 to 2-5 are being operated, while the server unit 2-6 serves as a pool server unit.

First, at step 1001, the PXE server 31 generates a pool server unit operating packet with a destination MAC address for the pool server unit 2-6. As a result, the pool server unit operating packet is received by the network switch 4, so that the control unit 43 carries out an operation of the routine of FIG. 6 as indicated by step 1002. That is, since the destination MAC address is registered in the MAC address storing unit 48 (see: FIG. 4E), the control proceeds from step 601 via step 602 to steps 603 and 604. As a result, the pool server unit operation packet is transmitted to the pool server unit 2-6 as indicated by step 1003. Note that the pool server unit operating packet is never transmitted to the user network by steps 603 and 604.

Next, at step 1004, the service processor 22 of the pool server unit 2-6 receives the pool server unit operating packet to power ON the main processor 21 thereof.

Next, at step 1005, the BIOS 21a of the main processor 21 of the pool server unit 2-6 is initiated to operate the PXE agent incorporated in this main processor 21.

Figure 9:
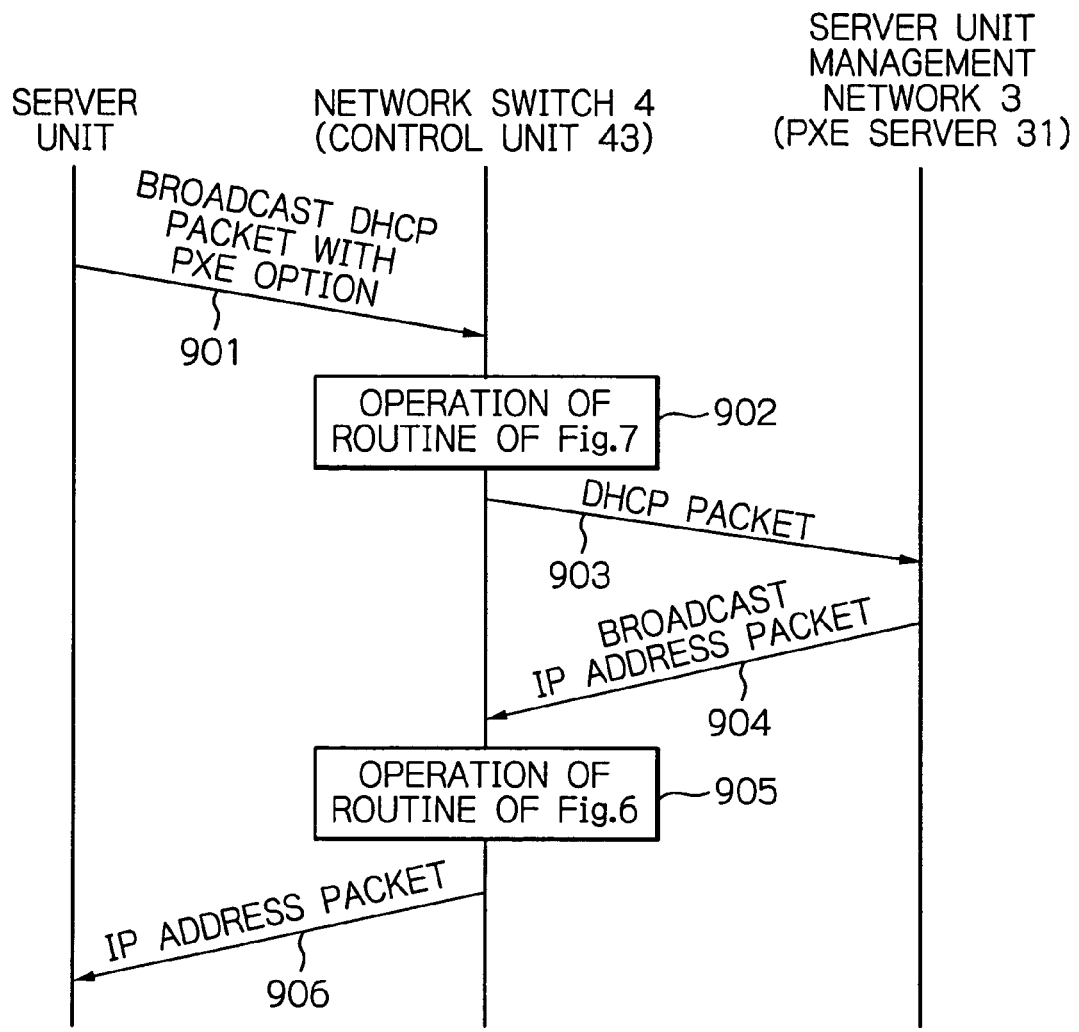
FIG. 9 is a sequence diagram for explaining an Internet protocol (IP) address assignment for the server unit management network to one of the server units of FIG. 1.

Next, at step 1006, the PXE agent of the main processor 21 of the pool server unit 2-6 requests an assignment of a provisional IP address for the server unit management network 3 using the sequence of FIG. 9. Thus, the provisional IP address is assigned to the pool server unit 2-6.

Next, at step 1007, the PXE agent of the main processor 21 of the pool server unit 2-6 generates a DHCP packet with a PXE Client option and the provisional IP address as a source address to request a boot file.

Next, at step 1008, the DHCP packet is received by the network switch 4, so that the control unit 43 carries out the operation of the routine of FIG. 7. That is, since the DHCP packet includes the PXE Client option, the control proceeds from step 701 via step 702 to steps 704 and 705. As a result, the server unit management port 41-2 is selected, and the DHCP packet is transmitted to the PXE server 31 as indicated by step 1009. Note that the DHCP packet is never transmitted to the user network 1 by steps 704 and 705.

Next, at step 1010, the PXE server 31 generates a boot file parameter packet with the IP provisional IP address as a destination address as well as its MAC address. The boot file parameter is the name of a boot file, for example.

Next, at step 1011, the boot file parameter packet is received by the network switch 4, so that the control unit 43 carries out the operation of the routine of FIG. 6. In this case, since the MAC address of the pool server unit 2-6 is registered in the MAC address storing unit 48 (see: FIG. 4E) and a port corresponding to the pool server unit 2-6 belongs to the server unit management network 3 (see: FIG. 4B), the control proceeds from step 601 via step 602 to steps 603 and 604. As a result, the boot file parameter packet is transmitted to the pool server unit 2-6 as indicated by step 1012. Note that the boot file packet is never transmitted to the user network 1 by steps 603 and 604.

Next, at step 1013, the PXE agent of the main processor 21 of the pool server unit 2-6 downloads the file of the boot file packet from the PXE server 31, thus installing the OS of an accessed server unit and its application software in the main processor 21.

Next, at step 1014, the PXE agent of the main processor 21 of the pool server unit 2-6 operates the OS and its application software.

Figure 8:
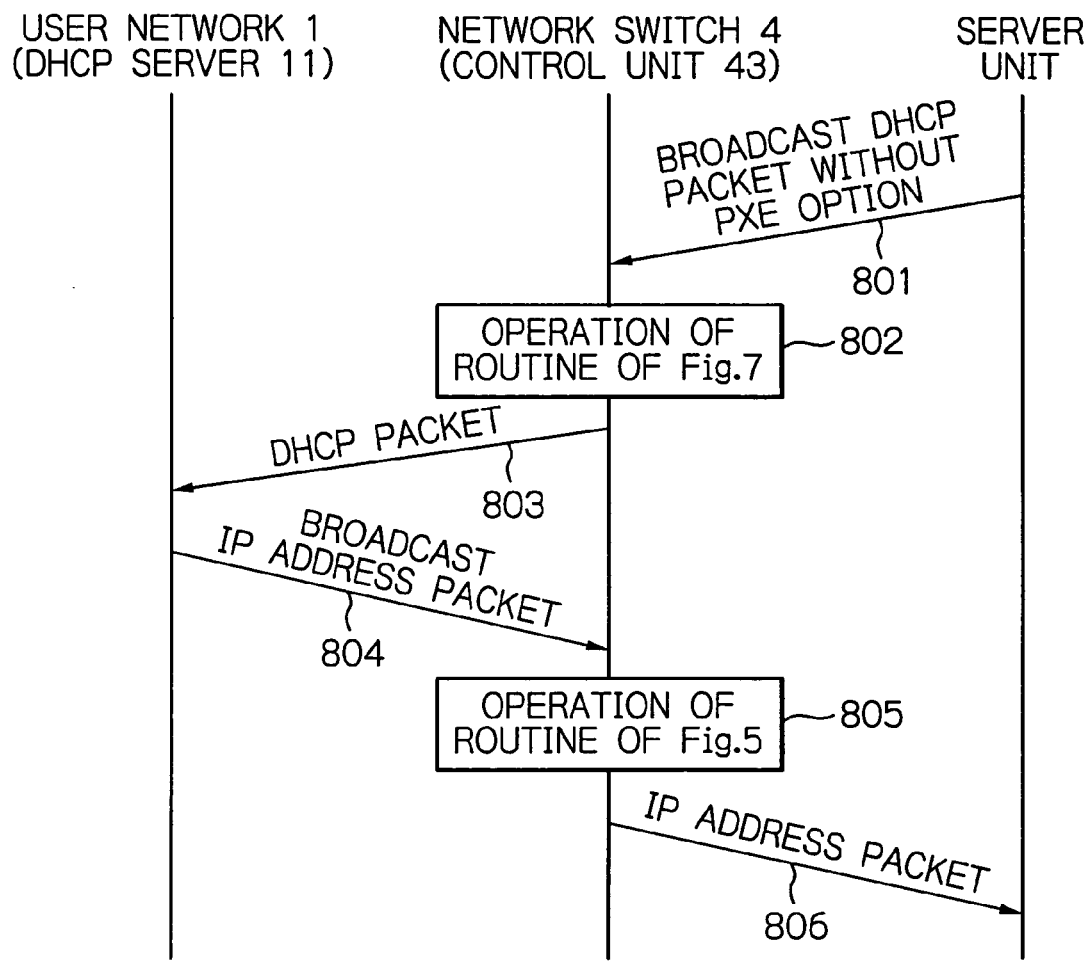
FIG. 8 is a sequence diagram for explaining an Internet protocol (IP) address assignment for the user network to one of the server units of FIG. 1.

Next, at step 1015, the PXE agent of the main processor 21 of the pool server unit 2-6 requests an assignment of an IP address for the user network 1 using the sequence of FIG. 8. Thus, the IP address is assigned to the pool server units, so that the pool server unit 2-6 becomes an operated server unit.

Figure 10:
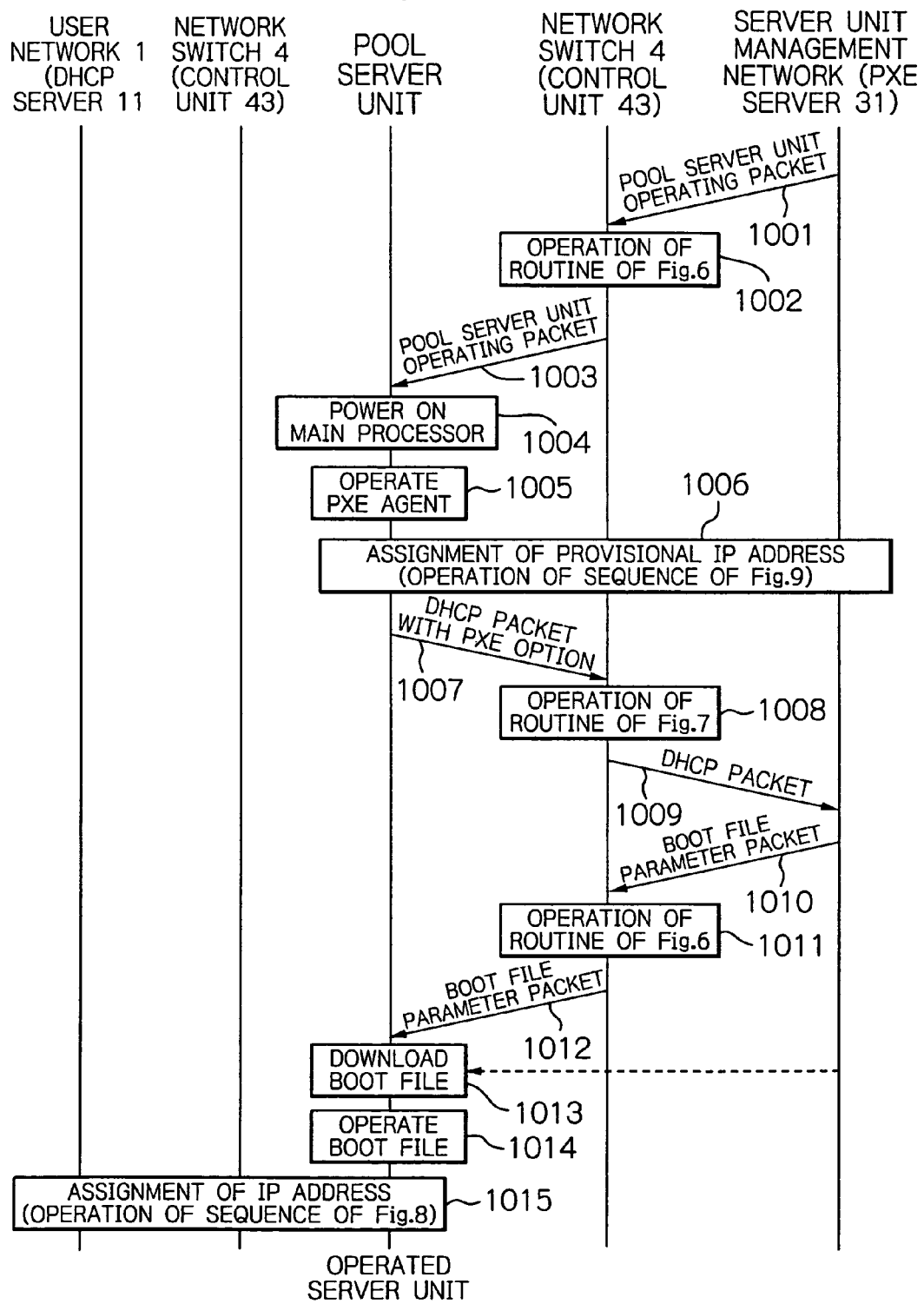
FIG. 10 is a sequence diagram for explaining a pre-boot execution environment (PXE) boot operation of one of the server units of FIG. 1.

In FIG. 10, the PXE boot operation can be carried out while the user network 1 and the server unit management network 3 are isolated from each other.

Figure 11:
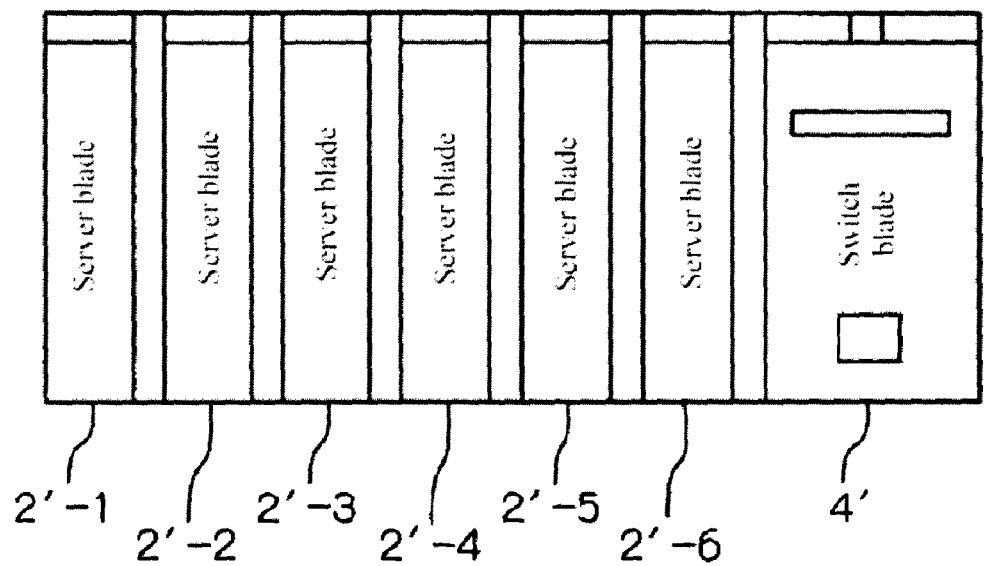
FIG. 11 is a diagram illustrating a modification of the server units and the network switch of FIG. 1.

In the above-described embodiment, the server units 2-1, 2-2, ..., 2-6 and the network switch 4 are independently provided; however, as illustrated in FIG. 11, the server units 2-1, 2-2, ..., 2-6 can be server blades 2'-1, 2'-2, ..., 2'-6, respectively, and the network switch 4 can be a switch blade 4'. In this case the server blades 2'-1, 2'-2, ..., 2'-6 and the switch blade 4' are mounted on one chassis, thus forming a blade server apparatus which has a high mounting integration. Since the number of processors in each of the server units (server blades) is decreased, the present invention is particularly effective in the above-mentioned blade server apparatus.

Figure 12:
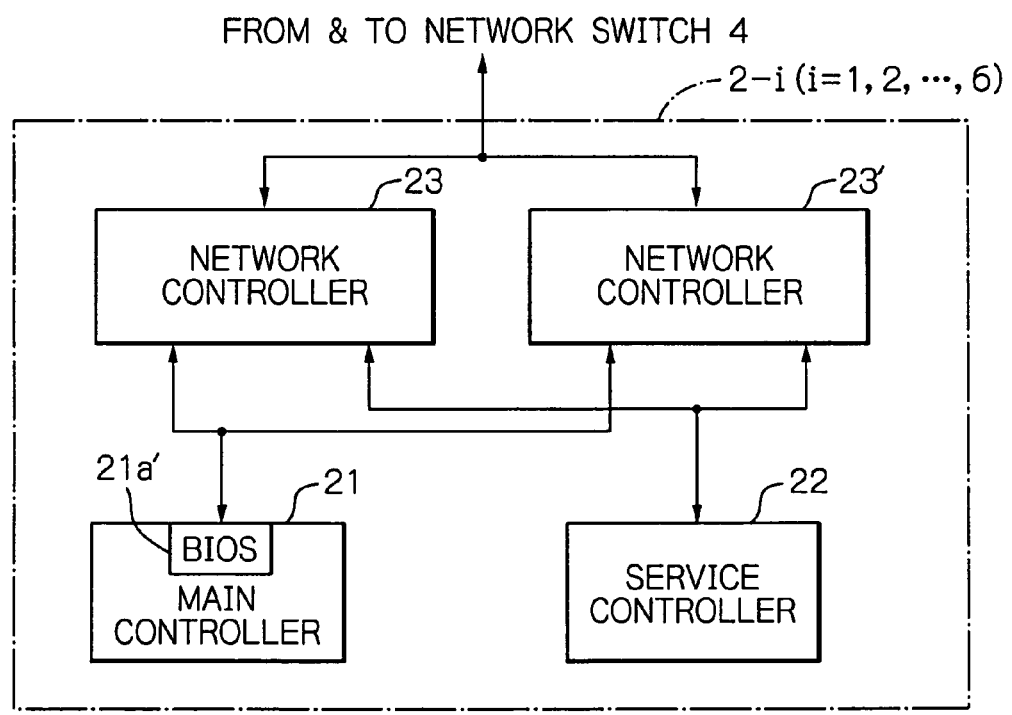
FIG. 12 is a block circuit diagram illustrating a modification of the server unit of FIG. 2.

Also, as illustrated in FIG. 12, a plurality of network controllers such as 23 and 23' can be provided in each of the server units 2-1, 2-2, ..., 2-6, so that, in the event of failure of the operating network controller 23 or 23', the network controller 23 or 23' is switched to the network controller 23' or 23.

As explained hereinabove, according to the present invention, a logical isolation between a user network and a server unit management network can be realized without VLANs and without decreasing the number of network controllers. Also, a PXE boot operation can be carried out while the user network and the server unit management network are isolated from each other.

The invention claimed is:

1. A network switch comprising:
   a user network port connectable to a user network, the user network comprising a dynamic host configuration protocol (DHCP) server;
   a plurality of down link ports each connectable to a server unit;
   a server unit management network port connectable to a server unit management network for managing server units connected to the down link ports, the server unit management network comprising a pre-boot execution environment (PXE) server;
   a store-and-forward switching unit connected to said user network port, said down link ports and said server unit management network port;
   a control unit connected to said store-and-forward switching unit, and
   a group register whereby the control unit is configured to transmit packets between the user network port and the down link ports, between the server management network port and the down link ports and between the down link ports and to prevent the transmission of packets between the user network port and the server management network port,
   wherein, when a first packet that has arrived at one of said down link ports is a dynamic host configuration protocol (DHCP) packet including a network boot option, said control unit operates said store-and-forward switching unit to transmit said first packet to said server unit management network port; and
   wherein the DHCP server and the PXE server are separate and distinct and provide logical isolation between the user network and the server unit management network.

2. The network switch as set forth in claim 1, wherein the group register comprises a server unit management network IP subnet register connected to said control unit and constructed to store an IP subnet of said server unit management network,
   wherein, when a second packet that has arrived at one of said down link ports is one of a non-DHCP packet and a DHCP packet including no network boot option and has a source IP subnet the same as said IP subnet stored in said server unit management network IP subnet register, said control unit operates said store-and-forward switching unit to transmit said second packet to said server unit management network port.

3. The network switch as set forth in claim 1, wherein the group register comprises:
   a server unit management network IP subnet register connected to said control unit and constructed to store an IP subnet of said server unit management network;
   a media access control (MAC) address storing unit connected to said control unit and constructed to store a correspondence between said user network port, said down link ports and said server unit management network port, and MAC addresses of nodes connected thereto; and
   a user network group register connected to said control unit and constructed to store data defining a user network group formed by said user network port and said down links,
   wherein, when a third packet that has arrived at one of said down link ports is one of a non-DHCP packet and a DHCP packet including no network boot option and has a source IP subnet different from said IP subnet stored in said server unit management network IP subnet register, and a destination MAC address stored in said MAC address storing unit corresponds to a port of said user network group defined by said user network group register, said control unit operates said store-and-forward switching unit to transmit said third packet to said port of said user network group.

4. The network switch as set forth in claim 1, wherein the group register comprises:
   a server unit management network IP subnet register connected to said control unit and constructed to store an IP subnet of said server unit management network;
   a media access control (MAC) address storing unit connected to said control unit and constructed to store a correspondence between said user network port, said down link ports and said server unit management network port, and MAC addresses of nodes connected thereto; and
   a user network group register connected to said control unit and constructed to store data defining a user network group formed by said user network port and said down links,
   wherein, when a fourth packet that has arrived at one of said down link ports is one of a non-DHCP packet and a DHCP packet including no network boot option and has a source IP subnet different from said IP subnet stored in said server unit management network IP subnet register, and a destination MAC address is not stored in said MAC address storing unit, said control unit operates said store-and-forward switching unit to transmit said fourth packet to all ports of said user network group except for the one of said clown link ports.

5. The network switch as set forth in claim 1, wherein the group register comprises:
   a server unit management network IP subnet register connected to said control unit and constructed to store an IP subnet of said server unit management network;
   a media access control (MAC) address storing unit connected to said control unit and constructed to store a correspondence between said user network port, said down link ports and said server unit management network port, and MAC addresses of nodes connected thereto; and a user network group register connected to said control unit and constructed to store data defining a user network group formed by said user network port and said down links, wherein, when a fifth packet that has arrived at one of said down link ports is one of a non-DHCP packet and a DHCP packet including no network boot option and has a source IP subnet different from said IP subnet stored in said server unit management network IP subnet register, and a destination MAC address stored in said MAC address storing unit and corresponding not to a port of said user network group defined by said user network group register, said control unit operates said store-and-forward switching unit to scrap said fifth packet.

6. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a user network group register connected to said control unit and constructed to store data defining a user network group formed by said user network port and said down links, wherein, when a sixth packet that has arrived at said user network port has a destination MAC address stored in said MAC address storing unit and corresponding to a port of said user network group defined by said user network group register, said control unit operates said store-and-forward switching unit to transmit said sixth packet to said port of said user network group.

7. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a user network group register connected to said control unit and constructed to store data defining a user network group formed by said user network port and said down links, wherein, when a seventh packet that has arrived at said user network port has a destination MAC address not stored in said MAC address storing unit, said control unit operates said store-and-forward switching unit to transmit said seventh packet to all ports of said user network group except for said user network port.

8. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a user network group register connected to said control unit and constructed to store data defining a user network group formed by said user network port and said down links, wherein, when an eighth packet that has arrived at said user network port has a destination MAC address stored in said MAC address storing unit and corresponding to a port of said user network group defined by said user network group register, said control unit operates said store-and-forward switching unit to scrap said eighth packet.

9. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a server unit management network group register connected to said control unit and constructed to store data defining a server unit management network group formed by said server unit management network port and said down links, wherein, when a ninth packet that has arrived at said server unit management network port has a destination MAC address stored in said MAC address storing unit and corresponding to a port of said server unit management network group defined by said server unit management network group register, said control unit operates said store-and-forward switching unit to transmit said ninth packet to said port of said server unit management network group.

10. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a server unit management network group register connected to said control unit and constructed to store data defining a server unit management network group formed by said server unit management network port and said down links, wherein, when a tenth packet that has arrived at said server unit management network port has a destination MAC address not stored in said MAC address storing unit, said control unit operates said store-and-forward switching unit to transmit said tenth packet to all ports of said server unit management network group except for said server unit management network port.

11. The network switch as set forth in claim 1, wherein the group register comprises:

a media access control (MAC) address storing unit connected to said control unit and constructed to store a correspondence between said user network port, said down link ports and said server unit management network port, and MAC addresses of nodes connected thereto; and a server unit management network group register connected to said control unit and constructed to store data defining a server unit management network group formed by said server unit management network port and said down links, wherein, when an eleventh packet that has arrived at said server unit management network port has a destination MAC address stored in said MAC address storing unit and corresponding not to a port of said server unit management network group defined by said server unit management network group register, said control unit operates said store-and-forward switching unit to scrap said eleventh packet.

12. The network switch as set forth in claim 4, wherein said fourth packet is a broadcast DHCP packet including no network boot option, for requesting an assignment of IP address for said user network to said server unit.

13. The network switch as set forth in claim 7, wherein said seventh packet is a broadcast IP address packet for assigning an IP address for said user network to said server unit.

14. The network switch as set forth in claim 1, wherein said first packet is a broadcast DHCP packet including no network boot option, for requesting an assignment of IP address for said server unit management network to said server unit.

15. The network switch as set forth in claim 10, wherein said tenth packet is a broadcast IP address packet for assigning an IP address for said server unit management network to said server unit.

16. The network switch as set forth in claim 1, wherein said server unit is a pool server unit, and said first packet is a DHCP packet including a network boot option, for requesting a boot file parameter for said server unit management network.

17. The network switch as set forth in claim 9, wherein said server unit is a pool server unit, and said ninth packet is a boot file parameter packet.

18. The network switch as set forth in claim 1, being a switch blade, said server units being server blades associated with said switch blade in one chassis, thus forming a blade server apparatus.

19. A network switch comprising:
a user network port connectable to a user network, the user network comprising a dynamic host configuration protocol (DHCP) server;
a plurality of down link ports each connectable to one server unit;
a server unit management network port connectable to a saver unit management network for managing said server unit, the server unit management network compromising a pre-boot execution environment (PXE) server;
a store-and-forward switching unit connected to said user network port, said down link ports and said server unit management network port;
a control unit connected to said store-and-forward switching unit;
a media access control (MAC) address storing unit connected to said control unit and constructed to store a correspondence between said user network port, said down link ports and said server unit management network port, and MAC addresses of nodes connected thereto; and
a user network group register connected to said control unit and constructed to store data defining a user network group formed by said user network port and said down links and to configure said control unit to allow the transmission of packets between the user network port and the down link ports, between the server management network port and the down link ports and between the down link ports and to prevent the transmission of packets between the user network port and the server management network port,
wherein, when a first packet that has arrived at said user network port has a destination MAC address stored in said MAC address storing unit and corresponding to a port of said user network group defined by said user network group register, said control unit operates said store-and-forward switching unit to transmit said first packet to said port of said user network group,
wherein, when a second packet that has arrived at said user network port has a destination MAC address not stored in said MAC address storing unit, said control unit operates said store-and-forward switching unit to transmit said second packet to all ports has of said user network group except for said user network port, and
wherein, when a third packet that has arrived at said user network port has a destination MAC address stored in said MAC address storing unit and corresponding not to a port of said user network group defined by said user network group register, said control unit operates said store-and-forward switching unit to scrap said third packet, and
wherein the DHCP server and the PXE server are separate and distinct and provide logical isolation between the user network and the server unit management network.

20. The network switch as set forth in claim 19, being a switch blade, said server units being server blades associated with said switch blade in one chassis, thus forming a blade server apparatus.

21. A network switch comprising:
a user network port connectable to a user network, the user network compromising a dynamic host configuration protocol (DHCP) server;
a plurality of down link ports each connectable to one server unit;
a server unit management network port connectable to a server unit management network for managing said server unit, the server unit management network compromising a pre-boot execution environment (PXE) server;
a store-and-forward switching unit connected to said user network port, said down link ports and said server unit management network port;
a control unit connected to said store-and-forward switching unit;
a media access control (MAC) address storing unit connected to said control unit and constructed to store a correspondence between said user network port, said down link ports and said server unit management network port, and MAC addresses of nodes connected thereto; and
a server unit management network group register connected to said control unit and constructed to store data defining a server unit management network group formed by said server unit management network port and said down links and to configure said control unit to allow the transmission of packets between the user network port and the down link ports, between the server management network port and the down link ports and between the down link ports and to prevent the transmission of packets between the user network port and the server management network port,
wherein, when a first packet that has arrived at said server unit management network port has a destination MAC address stored in said MAC address storing unit and corresponding to a port of said server unit management network group defined by said server unit management network group register, said control unit operates said store-and-forward switching unit to transmit said first packet to said port of said server unit management network group,
wherein, when a second packet that has arrived at said server unit management network port has a destination MAC address not stored in said MAC address storing unit, said control unit operates said store-and-forward switching unit to transmit said second packet to all ports of said server unit management network group except for said server unit management network port, and wherein, when a third packet that has arrived at said server unit management network port has a destination MAC address stored in said MAC address storing unit and corresponding not to a port of said server unit management network group defined by said server unit management network group register, said control unit operates said store-and-forward switching unit to scrap said third packet; and wherein the DHCP server and the PXE server are separate and distinct and provide logical isolation between the user network and the server unit management network.

22. The network switch as set forth in claim 21, being a switch blade, said server units being server blades associated with said switch blade in one chassis, thus forming a blade server apparatus.

23. A method for operating a network switch connected to a user network, server units and a server unit management network, for allowing the transmission of packets between the user network and the server unit, between the server unit management network and the server link units and between server units and preventing the transmission of packets between the user network and the server unit management network, comprising:

determining whether a packet that has arrived from one of said server units to said network switch is a dynamic host configuration protocol (DHCP) packet or a non-DHCP packet;

determining whether or not said packet includes a network boot option;

transmitting said packet to said server unit management network when said packet IS said DHCP packet and includes said network boot option; and configuring the server unit management network to operate with a pre-boot execution environment (PXE) server placed inside the server unit management network;

wherein the PXE server is separate and distinct from a dynamic host configuration protocol (DHCP) server that is located inside the user network, and wherein the PXE server and the DHCP server provide logical isolation between the user network and the server unit management network.

24. The method as set forth in claim 23, further comprising:
determining whether or not said packet includes a source Internet protocol (IP) subnet the same as an IP subnet of said server unit management network when said packet is said non-DHCP packet or when said packet does not include said network boot option; and transmitting said packet to said server unit management network when said packet includes said source IP subnet.

25. The method as set forth in claim 24, further comprising:
determining whether or not said packet includes a destination media access control (MAC) address that is registered in a MAC address storing unit of said network switch;

determining whether or not a port corresponding to said destination MAC address in said MAC address storing unit belongs to a user network group formed by said user network and said server units when said destination MAC address is registered; and transmitting said packet to said port when said port belongs to said user network group.

26. The method as set forth in claim 24, further comprising:
determining whether or not said packet includes a destination media access control (MAC) address that is registered in a MAC address storing unit of said network switch; and transmitting said packet to all ports belonging to a user network group formed by said user network and said server units except said one of said server units when said destination MAC address is not registered.

27. The method as set forth in claim 24, further comprising:
determining whether or not said packet includes a destination media access control (MAC) address that is registered in a MAC address storing unit of said network switch;

determining whether or not a port corresponding to said destination MAC address in said MAC address storing unit belongs to a user network group formed by said user network and said server units when said destination MAC address is registered; and scrapping said packet when said port does not belong to said user network group.

28. A method for operating a network switch comprised of a user network port connectable to a user network, the user network comprising; a dynamic host configuration protocol (DHCP) server; a plurality of down link ports each connectable to a server unit; a server unit management network port connectable to a server unit management network for managing server units connected to the down link ports; the server unit management network comprising a pre-boot execution environment (PXE) server: a store-and-forward switching unit connected to said user network port, said down link ports and said server unit management network port; a control unit connected to said store-and-forward switching unit, and a group, register whereby the control unit is configured to transmit packets between the user network port and the down link ports, between the server management network port and the down link ports and between the down link ports and to prevent the transmission of packets between the user network port and the server management network port said method comprising:

determining whether a packet that has arrived from said user network to said network switch includes a destination media access control (MAC) address that is registered in a MAC address storing unit of said network switch;

determining whether or not a port corresponding to said destination MAC address in said MAC address storing unit belongs to a user network group formed by said user network and a server unit when said destination MAC address is registered;

transmitting said packet to said port when said port belongs to said user network group; and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

29. A method for operating a network switch comprised of a user network port connectable to a user network, the user network comprising a dynamic host confirmation protocol (DHCP) server; a plurality of down link ports each connectable to a server unit: a server unit management network port connectable to a server unit management network for managing server units connected to the down link ports; the server unit management network comprising a pre-boot execution environment (PXE) sewer; a store-and-forward switching unit connected to said user network port, said down link ports and said server unit management network port; a control unit connected to said store-and-forward switching unit, and a group register whereby the control unit is confirmed to transmit packets between the user network port and the down link ports, between the server management network port and the down link ports and between the down link ports and to prevent the transmission of packets between the user network port and the server management network port, said method comprising:
- determining whether a packet that has arrived from said user network to said network switch includes a destination media access control (MAC) address that is registered in a MAC address storing unit of said network switch;
- transmitting said packet to all ports belonging to a user network group formed by said user network and a & server unit except said user network when said destination MAC address is not registered; and
- configuring the server unit management network to operate with said pre-boot execution environment (PXE) server placed inside the server unit management network;
- wherein the PXE server is separate and distinct from said dynamic host configuration protocol (DHCP) server that is located inside the user network, and wherein the PXE server and the DHCP server provide logical isolation between the user network and the server unit management network.

30. A method for operating a network switch comprised of a user network port connectable to a user network, the user network comprising a dynamic host configuration protocol (DHCP) server; a plurality of down link ports each connectable to a server unit; a server unit management network port connectable to a server unit management network for managing server units connected to the down link ports; the server unit management network comprising a pre-boot execution environment (PXE) sewer: a store-and-forward switching unit connected to said user network port; said down link ports and said server unit management network port; a control unit connected to said store-and-forward switching unit, and a group register whereby the control unit is configured to transmit packets between the user network port and the down link ports; between the server management network port and the down link ports and between the down link ports and to prevent the transmission of packets between the user network port and the server management network port, said method comprising:
- determining whether a packet that has arrived from said user network to said network switch includes a destination media access control (MAC) address that is registered in a MAC address storing unit of said network switch;
- determining whether or not a port corresponding to said destination MAC address in said MAC address storing unit belongs to a user network group formed by said user network and a server unit when said destination MAC address is registered;
- scrapping said packet when said port does not belong to said user network group; and
- configuring the server unit management network to operate with pre-boot execution environment (PXE) saver placed inside the server unit management network;
- wherein the PXE server is separate and distinct from said dynamic host configuration protocol (DHCP) server that is located inside the user network, and wherein the PXE server and the DHCP server provide logical isolation between the user network and the server unit management network.

31. A method for operating a network switch comprised of a user network port connectable to a user network, the user network comprising a dynamic host configuration protocol (DHCP) server; a plurality of down link ports each connectable to a server unit; a server unit management network port connectable to a server unit management network for managing server units connected to the down link ports, the server unit management network comprising a pre-boot execution environment (PXE) server: a store-and-forward switching unit connected to said user network port, said down link ports and said server unit management network port; a control unit connected to said store-and-forward switching unit, and a group register whereby the control unit is configured to transmit packets between the user network port and the down link ports, between the server management network port and the down link ports and between the down link ports and to prevent the transmission of packets between the user network port and the server management network port, said method comprising:
- determining whether a packet that has arrived from said server unit management network to said network switch includes a destination media access control (MAC) address that is registered in a MAC address storing unit of said network switch;
- determining whether or not a port corresponding to said destination MAC address in said MAC address storing unit belongs to a server unit management network group formed by said server unit management network and a server unit when said destination MAC address is registered;
- transmitting said packet to said port when said port belongs to said server unit management network group; and
- configuring the server unit management network to operate with pre-boot execution environment (PXE) sewer placed inside the server unit management network;
- wherein the PXE server is separate and distinct from said dynamic host configuration protocol (DHCP) server that is located inside the user network, and wherein the PXE server and the DHCP server provide logical isolation between the user network and the server unit management network.

32. A method for operating a network switch comprised of a user network port connectable to a user network; the user network comprising dynamic host configuration protocol (DHCP) server; a plurality of down link ports each connectable to a server unit: a server unit management network port connectable to a server unit management network for managing server units connected to the down link ports, the server unit management network comprising a pre-boot execution environment (PXE) server; a store-and-forward switching unit connected to said user network port, said down link ports and said server unit management network port; a control unit connected to said store-and-forward switching unit; and a group register whereby the control unit is configured to transmit packets between the user network port and the down link ports, between the server management network port and the down link ports and between the down link ports and to prevent the transmission of packets between the user network port and the server management network port, said method comprising:
- determining whether a packet that has arrived from said server unit management network to said network switch includes a destination media access control (MAC) address that is registered in a MAC address storing unit of said network switch;

transmitting said packet to all ports belonging to a server unit management network group formed by said server unit management network and a server unit except said server unit management network when said destination MAC address is not registered; and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

33. A method for operating a network switch comprised of a user network port connectable to a user network, the user network comprising a dynamic host configuration protocol (DHCP) server; a plurality of down link ports each connectable to a server unit; a server unit management network port connectable to a server unit management network for managing server units connected to the down link ports, the server unit management network comprising a pre-boot execution environment (PXE) server; a store-and-forward switching unit connected to said user network port, said down link ports and said server unit management network port; a control unit connected to said store-and-forward switching unit, and a group register whereby the control unit is configured to transmit packets between the user network port and the down link ports, between the server management network port and the down link ports and between the down link ports and to prevent the transmission of packets between the user network port and the server management network port, said method comprising:

determining whether a packet that has arrived from said server unit management network to said network switch includes a destination media access control (MAC) address that is registered in a MAC address storing unit of said network switch;

determining whether or not a port corresponding to said destination MAC address in said MAC address storing unit belongs to a server unit management network group formed by said server unit management network and a server unit when said destination MAC address is registered;

scrapping said packet when said port does not belong to said server unit management network group; and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

34. A method for operating a network switch comprised of a user network port connectable to a user network, the user network comprising a dynamic host confirmation protocol (DHCP) server; a plurality of down link ports each connectable to a server unit: a server unit management network port connectable to a server unit management network for managing server units connected to the down link ports, the server unit management network comprising a pre-boot execution environment (PXE) server; a store-and-forward switching unit connected to said user network port, said down link ports and said server unit management network port; a control unit connected to said store-and-forward switching unit; and a group register whereby the control unit is configured to transmit packets between the user network port and the down link ports, between the server management network port and the down link ports and between the down link ports and to prevent the transmission of packets between the user network port and the server management network port, said method comprising:

receiving a broadcast dynamic host configuration protocol (DHCP) packet including no network boot option from one of said a server unit, to transmit said broadcast DHCP packet to said user network;

receiving a broadcast Internet protocol (IP) address packet from said user network in response to said broadcast DHCP packet, to transmit said broadcast IP address packet to a server unit; and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

35. A method for operating a network switch comprised of a user network port connectable to a user network, the user network comprising a dynamic host configuration protocol (DHCP) server; a plurality of down link ports each connectable to a server unit; a server unit management network port connectable to a server unit management network for managing server units connected to the down link ports, the server unit management network comprising a pre-boot execution environment (PXE) server; a store-and-forward switching unit connected to said user network port, said down link ports and said server unit management network port; a control unit connected to said store-and-forward switching unit, and a group register whereby the control unit is configured to transmit packets between the user network port and the down link ports; between the server management network port and the down link ports and between the down link ports and to prevent the transmission of packets between the user network port and the server management network port, said method comprising:

receiving a broadcast dynamic host configuration protocol (DHCP) packet including a network boot option from a server unit, to transmit said broadcast DHCP packet to said server unit management network;

receiving a broadcast Internet protocol (IP) address packet from said server unit management network in response to said broadcast DHCP packet, to transmit said broadcast IP address packet to a server unit; and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

36. A method for operating a network switch comprised of a user network port connectable to a user network, the user network comprising a dynamic host configuration protocol (DHCP) server; a plurality of down link ports each connectable to a server unit; a server unit management network port connectable to a server unit management network for managing server units connected to the down link ports, the server unit management network comprising a pre-boot execution environment (PXE) server; a store-and-forward switching unit connected to said user network port, said down link ports and said server unit management network port; a control unit connected to said store-and-forward switching unit; and a group register whereby the control unit is configured to transmit packets between the user network port and the down link ports, between the server management network port and the down link ports and between the down link ports and to prevent the transmission of packets between the user network port and the server management network port, said method comprising:

receiving a dynamic host configuration protocol (DHCP) packet including a network boot option from a pool server unit, to transmit said DHCP packet to said server unit management network;

receiving a boot file parameter packet from said server unit management network in response to said DHCP packet, to transmit said boot file parameter packet to said pool server unit and configuring the server unit management network to operate with said pre-boot execution environment (PXE) server placed inside the server unit management network;

wherein the PXE server is separate and distinct from said dynamic host configuration protocol (DHCP) server that is located inside the user network, and wherein the PXE server and the DHCP server provide logical isolation between the user network and the server unit management network.

\* \* \* \* \*